(12) United States Patent
Mukai et al.

(10) Patent No.: US 11,014,556 B2
(45) Date of Patent: May 25, 2021

(54) DRIVING SUPPORT APPARATUS

(71) Applicant: DENSO CORPORATION, Kariya (JP)

(72) Inventors: Yasuhiko Mukai, Kariya (JP); Hiroaki Ooshima, Kariya (JP); Hitoshi Wada, Kariya (JP)

(73) Assignee: DENSO CORPORATION, Kariya (JP)

( * ) Notice: Subject to any disclaimer, the term of this patent is extended or adjusted under 35 U.S.C. 154(b) by 529 days.

(21) Appl. No.: 15/579,124

(22) PCT Filed: May 25, 2016

(86) PCT No.: PCT/JP2016/065401
§ 371 (c)(1),
(2) Date: Dec. 1, 2017

(87) PCT Pub. No.: WO2016/194722
PCT Pub. Date: Dec. 8, 2016

(65) Prior Publication Data
US 2018/0162395 A1   Jun. 14, 2018

(30) Foreign Application Priority Data

Jun. 4, 2015   (JP) .............................. JP2015-114163

(51) Int. Cl.
*B60W 30/12*   (2020.01)
*B60W 40/072*   (2012.01)
(Continued)

(52) U.S. Cl.
CPC .......... *B60W 30/12* (2013.01); *B60W 30/143* (2013.01); *B60W 30/146* (2013.01);
(Continued)

(58) Field of Classification Search
None
See application file for complete search history.

(56) References Cited

U.S. PATENT DOCUMENTS 6,134,509 A * 10/2000 Furusho ................... B62D 6/00
  702/167
8,260,482 B1   9/2012 Szybalski et al.
(Continued)

FOREIGN PATENT DOCUMENTS

DE   102014220496 A1 * 4/2016 ............ B60W 50/14
JP   H03-282713      12/1991
(Continued)

*Primary Examiner* — Aniss Chad
*Assistant Examiner* — Kelly D Williams
(74) *Attorney, Agent, or Firm* — Maschoff Brennan

(57) ABSTRACT

A driving support control unit of a driving support apparatus executes driving support control for supporting at least part of driving by a driver. A support determining unit determines whether or not predetermined conditions for terminating the driving support control are satisfied. A physical amount acquiring unit acquires a physical amount corresponding to a curviness degree of a driving lane on which an own vehicle drives. A curviness degree determining unit determines whether or not a curviness degree indicated by the physical amount acquired by the physical amount acquiring unit is smaller than a predetermined degree in the case where the predetermined conditions for terminating the driving support control are satisfied. A termination command unit commands the driving support control unit to terminate the driving support control if the curviness degree determining unit determines that the curviness degree is smaller than the predetermined degree.

13 Claims, 11 Drawing Sheets

(51) Int. Cl.
*B60W 30/14* (2006.01)
*B60W 50/14* (2020.01)
*B62D 15/02* (2006.01)
*G08G 1/16* (2006.01)
*B62D 7/15* (2006.01)

(52) U.S. Cl.
CPC .......... *B60W 40/072* (2013.01); *B60W 50/14* (2013.01); *B62D 7/159* (2013.01); *B62D 15/025* (2013.01); *G08G 1/167* (2013.01); *B60W 2420/42* (2013.01); *B60W 2520/10* (2013.01); *B60W 2540/18* (2013.01); *B60W 2552/05* (2020.02); *B60W 2552/30* (2020.02); *B60W 2556/50* (2020.02)

(56) References Cited

U.S. PATENT DOCUMENTS

| | | | | |
|---|---|---|---|---|
| 2003/0204299 | A1* | 10/2003 | Waldis | B60K 31/0058 701/96 |
| 2010/0185363 | A1* | 7/2010 | Buerkle | B62D 15/025 701/41 |
| 2012/0029773 | A1* | 2/2012 | Fujita | B62D 6/00 701/41 |
| 2012/0046802 | A1 | 2/2012 | Inou et al. | |
| 2012/0179304 | A1* | 7/2012 | Tokumochi | B60W 50/10 701/1 |
| 2014/0129092 | A1* | 5/2014 | Mori | B60K 37/06 701/49 |
| 2015/0344027 | A1* | 12/2015 | Oooka | G01C 21/26 701/408 |
| 2016/0107655 | A1* | 4/2016 | Desnoyer | B60W 30/12 701/23 |
| 2016/0221575 | A1* | 8/2016 | Posch | B60W 50/0098 |
| 2017/0297622 | A1* | 10/2017 | Niemz | G08G 1/09626 |
| 2017/0364070 | A1* | 12/2017 | Oba | B60W 30/182 |

FOREIGN PATENT DOCUMENTS

| | | | |
|---|---|---|---|
| JP | 2008-260381 | | 10/2008 |
| JP | 2008-260381 | A | 10/2008 |
| JP | 2008260381 | A * | 10/2008 |
| JP | 2009-298182 | A | 12/2009 |
| JP | 2009-298192 | | 12/2009 |
| JP | 2012-041020 | A | 3/2012 |
| JP | 2015-085823 | | 5/2015 |
| JP | 2015-085823 | A | 5/2015 |

* cited by examiner

DRIVING SUPPORT APPARATUS

CROSS-REFERENCE TO RELATED APPLICATION

This application is based on and claims the benefit of priority from earlier Japanese Patent Application No. 2015-114163 filed Jun. 4, 2015, the description of which is incorporated herein by reference.

TECHNICAL FIELD

The present invention relates to a technique of supporting at least part of driving by a driver.

BACKGROUND ART

Various techniques of driving support control for supporting at least part of driving by a driver have been proposed. For example, PTL 1 discloses a technique in which a driving support system notifies to a driver a fact that predetermined conditions for executing driving support control are satisfied and, when the driver releases his/her hand from a steering wheel, the driving support system executes driving support control.

With the technique disclosed in PTL 1, if it is detected that the driver touches a specific location of the steering wheel during driving support control, it is judged that conditions for terminating driving support control are satisfied, and the driving support control is terminated, so that driving shifts to driving by the driver.

CITATION LIST

Patent Literature

[PTL 1] U.S. Pat. No. 8,260,482 B

SUMMARY OF THE INVENTION

Technical Problem

However, there is a case where, when conditions for terminating driving support control are satisfied during execution of the driving support control, and driving shifts from driving support control to driving by a driver, a vehicle drives on a driving lane with a large curviness degree. In this case, if driving immediately shifts from driving support control to driving by the driver, because the driver suddenly drives on a driving lane with a large curviness degree, that is, suddenly addresses a situation where driving is difficult, driving becomes a great burden for the driver.

The present invention has been made in view of the above-described circumstances, and is directed to providing a technique of reducing a burden of driving by the driver to be as small as possible in accordance with a curviness degree of a driving lane when conditions for terminating driving support control and shifting driving to driving by the driver are satisfied.

Solution to Problem

A driving support apparatus according to an aspect of the present invention includes a driving support control unit, a support determining unit, a physical amount acquiring unit, a curviness degree determining unit and a termination command unit.

The driving support control unit executes driving support control for supporting at least part of driving by a driver. The support determining unit determines whether or not predetermined conditions for terminating driving support control by the driving support control unit are satisfied. The physical amount acquiring unit acquires a physical amount corresponding to a curviness degree of a driving lane on which an own vehicle drives.

The curviness degree determining unit determines whether or not the curviness degree indicated by the physical amount acquired by the physical amount acquiring unit is smaller than a predetermined degree when the support determining unit determines that the predetermined conditions for terminating the driving support control are satisfied. The termination command unit commands the driving support control unit to terminate the driving support control when the curviness degree determining unit determines that the curviness degree is smaller than the predetermined degree.

According to this configuration, even if the predetermined conditions for terminating the driving support control are satisfied, in the case where the curviness degree of the driving lane on which the own vehicle drives is larger than the predetermined degree, the driving support control is continued. By this means, because it is possible to avoid a situation where the driver suddenly drives on a driving lane with a large curviness degree, that is, suddenly addresses a situation where driving is difficult, it is possible to reduce a burden of driving by the drive as small as possible.

DESCRIPTION OF EMBODIMENTS

Figure 1A:
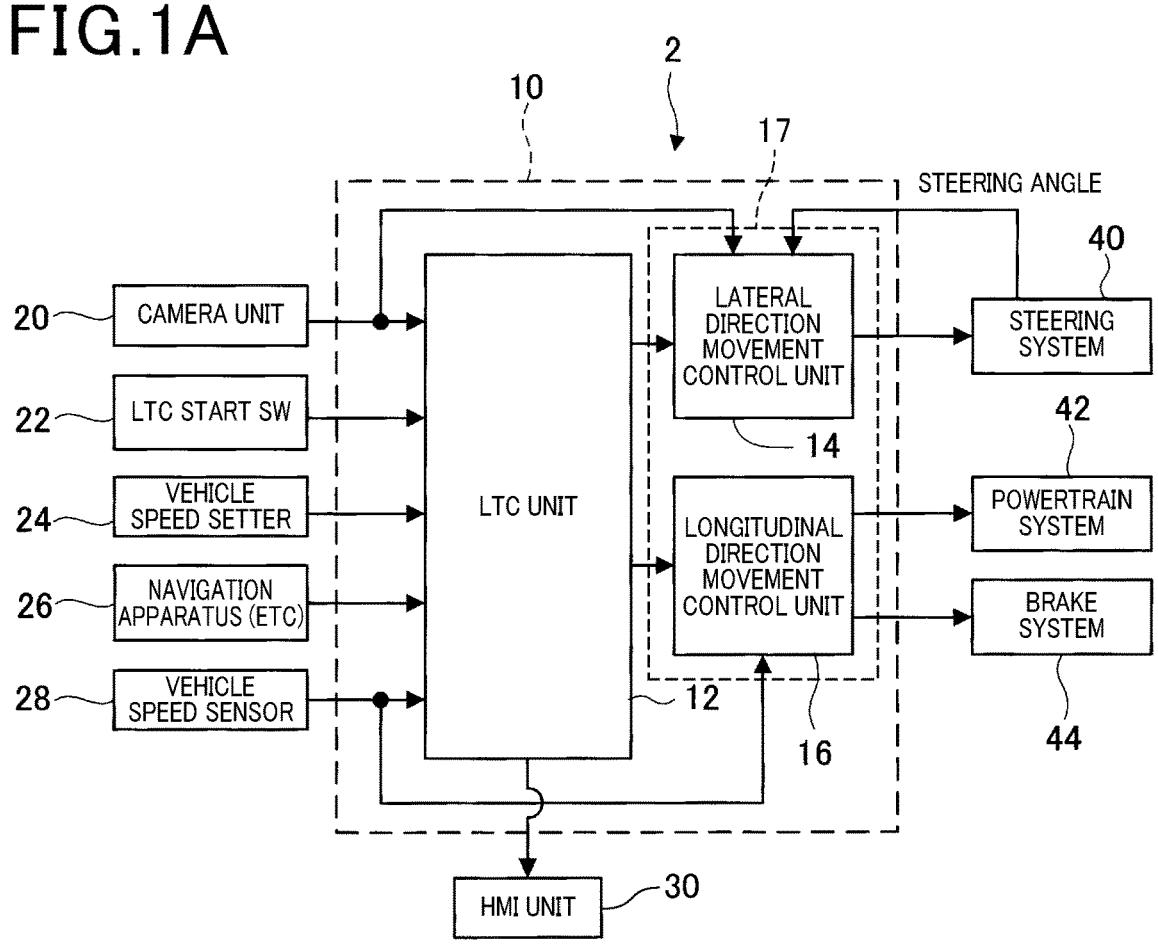
FIG. 1A is a block diagram illustrating a driving support system according to the present embodiment.

Embodiments of the present invention will be described in more detail below. However, the present invention may be implemented in a number of different forms, and it should not be construed that the present invention is limited to the embodiments described in the present specification. These embodiments are rather provided to make the disclosure of this invention thorough and complete and to completely convey the scope of the present invention to a person skilled in the art. Note that similar reference numerals indicate similar components throughout the drawings.

(1. Configuration)

A driving support system 2 illustrated in FIG. 1A includes a driving support apparatus 10, a camera unit 20, an LTC (Lane Trace Control) start switch (SW) 22, a vehicle speed setter 24, a navigation apparatus 26, a vehicle speed sensor 28, an HMI (Human Machine Interface) unit 30, a steering system 40, a powertrain system 42 and a brake system 44. In the following description, a vehicle on which the driving support system 2 is mounted will be referred to as an own vehicle.

The driving support apparatus 10, in which a computer including a CPU (Central Processing Unit), a RAM (Random Access Memory), a ROM (Read-Only Memory), an input/output interface, or the like, is mounted, functions as the LTC unit 12, the lateral direction movement control unit 14 and the longitudinal direction movement control unit 16 by the CPU executing various kinds of programs stored in the ROM.

The LTC unit 12 executes lane trace control of causing the own vehicle to drive within a driving lane on which the own vehicle is currently driving and which is separated from left and right lanes with white lines on the basis of image data captured by the camera unit 20.

The lateral direction movement control unit 14 directs torque for driving a steering wheel to the steering system 40 on the basis of a parameter and a flag acquired from the LTC unit 12 in lane trace control. By the lateral direction movement control unit 14 directing the torque for driving the steering wheel to the steering system 40 in the lane trace control, the own vehicle drives at a commanded lateral position in the driving lane.

The longitudinal direction movement control unit 16 directs drive output for causing the own vehicle to drive to the powertrain system 42 and directs braking force to the brake system 44 on the basis of the parameter and the flag acquired from the LTC unit 12 in the lane trace control. By the longitudinal direction movement control unit 16 directing the drive output to the powertrain system 42 and directing the braking force to the braking system 44, the own vehicle drives at a commanded vehicle speed set by the vehicle speed setter 24 in the lane trace control.

Note that, even if the commanded vehicle speed is set by the vehicle speed setter 24 in the lane trace control, in the case where the own vehicle drives while following a forward vehicle, or in the case where the own vehicle exits from a motorway, or the like, the commanded vehicle speed is decreased as appropriate regardless of the vehicle speed set by the vehicle speed setter 24.

The camera unit 20 detects left and right white lines which define a driving lane on which the own vehicle drives, for example, on the basis of a luminance difference between the white lines and a road, on the basis of image data captured by a camera attached to, for example, a position near the center of a mirror of a window shield inside a vehicle interior of the own vehicle. The camera unit 20 calculates curvature of the driving lane on the basis of coordinates of the detected left and right white lines, for example, as will be described later. Further, the camera unit 20 calculates a yaw angle of the own vehicle, a lateral position of the own vehicle with respect to a reference point, or the like, on the basis of the image data.

Either an ON position or an OFF position from a reference position of the LTC start SW 22, which is a lever switch attached at a central portion of the steering wheel, can be selected through manipulation by the driver. If the driver selects ON or OFF from the reference position of the LTC start SW 22 and releases his/her hand, the LTC start SW 22 returns to the reference position from ON or OFF.

If the driver turns on the LTC start SW 22, the LTC unit 12 judges that the driver commands start of the lane trace control. If the driver turns off the LTC start SW 22, the LTC unit 12 judges that the driver commands termination of the lane trace control.

The vehicle speed setter 24 receives input of commanded vehicle speed when the LTC unit 12 executes the lane trace control through manipulation of a touch panel, or the like, by the driver.

The navigation apparatus 26 performs route guidance to a destination on the basis of a current position of the own vehicle and the destination of the own vehicle input through a touch panel, or the like. The navigation apparatus 26 receives a positioning signal from a positioning satellite such as a GPS satellite and maps a position of the own vehicle on the basis of map information stored in a map DB.

In the case where an ETC (Electronic Toll Collection System: registered trademark) apparatus is mounted, the navigation apparatus 26 detects entry to a motorway and exit from a motorway by acquiring passing through an ETC gate from the ETC apparatus in a case of a toll road, and transmits the detection result to the LTC unit 12.

In the case where an ETC apparatus is not mounted or in a case of a toll-free motorway, the navigation apparatus 26 may detect entry to a motorway and exit from a motorway on the basis of the position of the own vehicle and transmit the detection result to the LTC unit 12.

The navigation apparatus 26 indicates whether the own vehicle enters or exits from a motorway using the variable driveway_state. driveway_state=1 indicates a state where the own vehicle enters a motorway, while driveway_state=0 indicates a state where the own vehicle exits from a motorway.

The HMI unit 30 notifies an execution state of lane trace control to the driver in accordance with an instruction from the LTC unit 12 using at least one of sound, an image and light.

The steering system 40 drives the steering wheel in accordance with the torque directed from the lateral direction movement control unit 14 and controls movement in a lateral direction of the own vehicle.

The powertrain system 42 controls opening of a throttle apparatus and a fuel injection amount in the case where an internal combustion is mounted as a drive source, while controlling power to be supplied to a motor in the case where the motor is mounted as the drive source, in accordance with the drive output directed from the longitudinal direction movement control unit 16.

The brake system 44 controls an actuator provided at a hydraulic pressure circuit of a hydraulic brake in accordance with braking force directed from the longitudinal direction movement control unit 16. In the case where a motor is mounted on the own vehicle as the drive source, the brake system 44 may control power to be supplied to the motor to generate braking force using a regenerative brake in accordance with the braking force directed from the longitudinal direction movement control unit 16.

(2. Processing)

Processing to be executed by the driving support system 2 will be described below. The flowcharts in FIGS. 2 and 5 to 9 are constantly executed at predetermined time intervals.

(2-1. Processing of Camera Unit 20) Processing to be executed by the camera unit 20 will be described. In step S400 in FIG. 2, the camera unit 20 detects white lines from captured image data and calculates positions of both left and right white lines to approximately 150 meters ahead in a driving direction as boundary positions of a driving lane on which the own vehicle is to drive from now.

Figure 3:
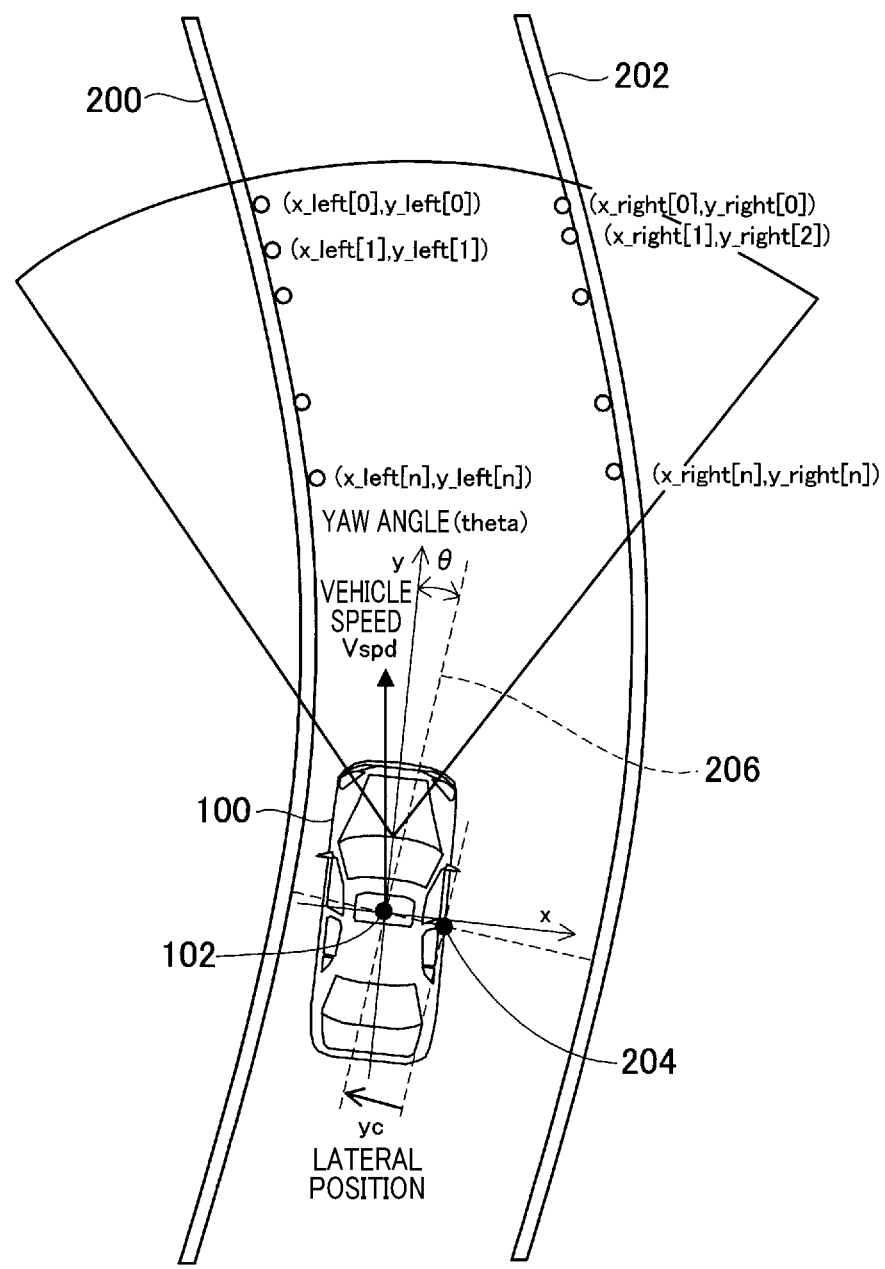
FIG. 3 is a schematic diagram explaining calculation of curvature.

As illustrated in FIG. 3, in the camera unit 20, for example, a center of gravity 102 of the own vehicle 100 is set as an origin, a width direction of the own vehicle 100 is set as an x axis, a direction orthogonal to the x axis is set as a y axis. That is, the y axis indicates orientation of the own vehicle 100. The camera unit 20 calculates positions of the left and right white lines 200 and 202, for example, from the own vehicle 100 to approximately 150 meters ahead.

The camera unit 20 acquires x coordinates and y coordinates of the position of the left white line 200 from (x_left [0], y_left [0]) to (x_left [n], y_left [n]). Further, the camera unit 20 acquires x coordinates and y coordinates of the position of the right white line 202 from (x_right [0], y_right [0]) to (x_right [n], y_right [n]).

In step S402, the camera unit 20 calculates 15 curvature values (rho) of the driving lane of the own vehicle defined with the coordinate positions of both the left and right white lines 200 and 202 calculated in step S400 at intervals of 10 meters, for example, from the own vehicle 100 to 150 meters ahead. As the curvature (rho) of the driving lane, curvature of one of the left and right white lines 200 and 202 may be calculated, or curvature of a center line of the driving lane which passes through a central position 204 in a width direction of the driving lane may be calculated.

In the present embodiment, curvature of the driving lane ahead of the own vehicle 100 in a driving direction is calculated as a physical amount corresponding to a curviness degree of the driving lane ahead of the own vehicle 100 in the driving direction.

Figure 4:
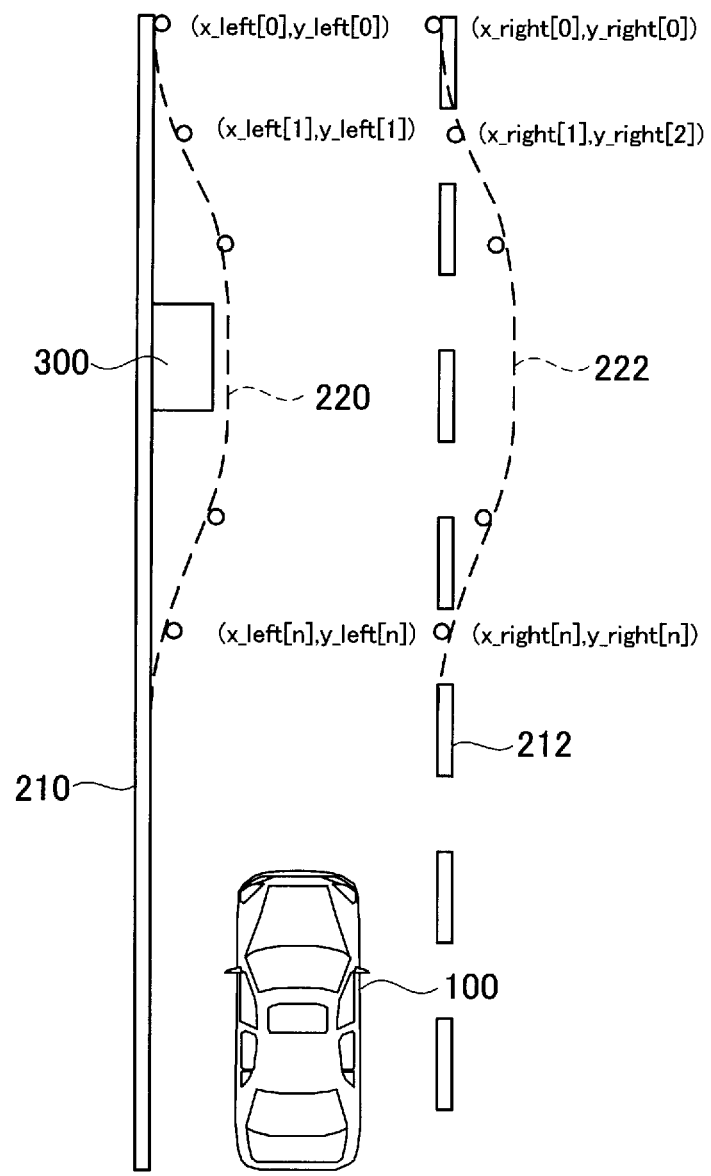
FIG. 4 is another schematic diagram explaining calculation of curvature.

As illustrated in FIG. 4, in the case where there exists an obstacle 300 ahead of the own vehicle 100, the camera unit 20 sets left and right boundaries 220 and 222 so as to avoid the obstacle 300 in place of the left and right white lines 210 and 212 and calculates x coordinates and y coordinates of the boundaries 220 and 222 in a similar manner to the white lines 210 and 212.

The camera unit 20 then calculates curvature of the driving lane of the own vehicle defined with the coordinate positions of the left and right white lines 210 and 212 and the boundaries 220 and 222 in place of the white lines 210 and 212 in a range where the boundaries 220 and 222 are set, at intervals of 10 meters from the own vehicle 100 to approximately 150 meters ahead.

Further, in step S402, the camera unit 20 calculates a yaw angle and a lateral positon of the own vehicle. The yaw angle (theta) of the own vehicle indicates an angle formed by the y axis which is orientation of the own vehicle and a tangent line 206 of the driving lane at the center of gravity 102 of the own vehicle 100 as illustrated in FIG. 3. The lateral position (yc) indicates a distance from the central position 204 of the driving lane which passes through the center of gravity 102 of the own vehicle 100 to the center of gravity 102 of the own vehicle 100.

(2-2. Detection Processing of LTC Start SW 22)

Processing of detecting manipulation of the LTC start SW 22 by the driver will be described.

Figure 5:
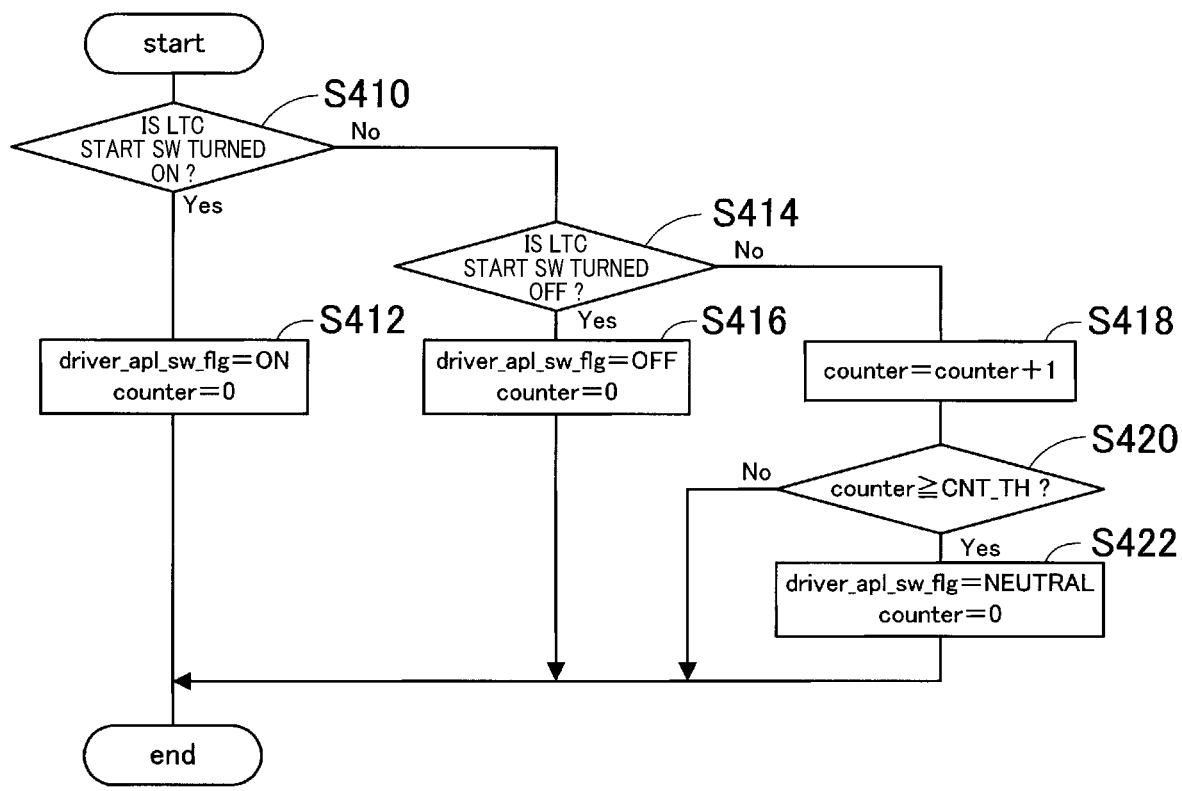
FIG. 5 is a flowchart illustrating detection processing of an LTC start SW.

In step S410 in FIG. 5, when the driver turns on the LTC start SW 22 (step S410: Yes), the LTC start SW 22 turns on driver_apl_sw_flg and initializes a counter by setting 0 (step S412). ON of driver_apl_sw_flg indicates that the driver turns on the LTC start SW 22 to command start of lane trace control, while OFF indicates that the driver turns off the LTC start SW 22 to command termination of lane trace control.

If the driver turns off the LTC start SW 22 instead of turning on the LTC start SW 22 (step S410: No, step S414: Yes), the LTC start SW 22 turns off driver_apl_sw_flg and initializes a counter by setting 0 (step S416).

If the driver neither turns on or off the LTC start SW 22 (step S410: No, step S414: No), the LTC start SW 22 increments the counter by one (step S418), and determines whether or not a value of the counter is equal to or greater than a constant (CNT_TH) set in advance (step S420). Because the processing in FIG. 5 is executed at intervals of a predetermined time period, determination as to whether or not the value of the counter is equal to or greater than the constant (CNT_TH) indicates determination as to whether or not a predetermined time period corresponding to the constant (CNT_TH) has elapsed.

If the value of the counter is equal to or greater than CNT_TH (step S420: Yes), the LTC start SW 22 puts driver_apl_sw_flg into neutral and initializes the counter by setting 0 (step S422). Putting driver_apl_sw_flg into neutral in step S422 indicates that the predetermined time period has elapsed without the LTC start SW 22 being turned on or off.

If the value of the counter is less than CNT_TH (step S420: No), the LTC start SW 22 terminates the processing. That is, if the driver turns on the LTC start SW 22, the ON state of driver_apl_sw_flg continues until the predetermined time period elapses since the value of the counter becomes equal to or greater than CNT_TH. Further, if the driver turns off the LTC start SW 22, the OFF state of driver_apl_sw_flg continues until the predetermined time period elapses since the value of the counter becomes equal to or greater than CNT_TH.

(2-3. LTC Processing)

LTC processing to be executed by the LTC unit 12 will be described.

Figure 6:
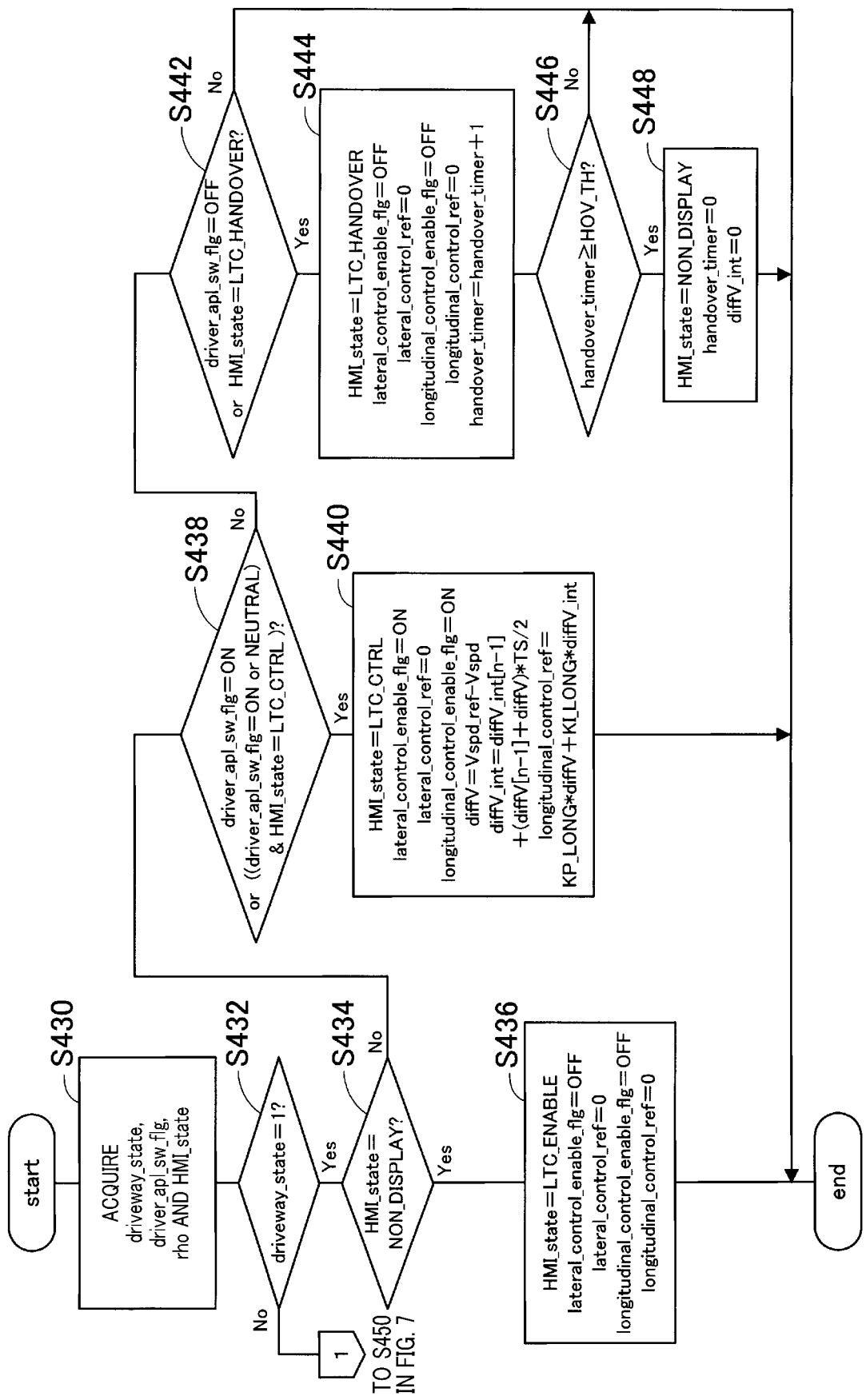
FIG. 6 is a flowchart illustrating LTC processing.

In step S430 in FIG. 6, the LTC unit 12 acquires driveway_state and rho from the camera unit 20, acquires driver_apl_sw_flg from the LTC start SW 22 and acquires HMI_state set by the LTC unit 12 itself.

HMI_state indicates an execution state of the lane trace control notified to the driver by the HMI unit 30 on the basis of an instruction from the LTC unit 12. The notified content of HMI_state includes the following five types from (1) to (5). The content of HMI_state is notified using at least one of a speaker, a display, or the like, with at least one of sound, an image and light. An initial value of HMI_state is NON_DISPLAY.

(1) NON_DISPLAY: there is no notification information
(2) LTC_ENABLE: LTC can be executed
(3) LTC_CTRL: LTC is being executed
(4) LTC_DESABLE_WARNING: it is announced that LTC is to be terminated
(5) LTC_HANDOVER: driving control is transferred to the driver NON_DISPLAY indicates that HMI_state is none of the above-described (2) to (5) and there is no content of the execution state of the lane trace control to be notified to the driver. LTC_ENABLE indicates that, while the own vehicle enters a motorway and lane trace control can be executed, the LTC start SW 22 has not been turned on yet. LTC_CTRL indicates that lane trace control is being executed.

LTC_DESABLE_WARNING indicates that, while conditions for terminating lane trace control are satisfied since the own vehicle has exited from a motorway, because curvature of the driving lane is large and a curviness degree of the driving lane is large, the own vehicle is waiting until the lane trace control is terminated. LTC_HANDOVER indicates that lane trace control is terminated and processing for transferring driving control to the driver is started.

In step S432, the LTC unit 12 determines whether driveway_state=1, that is, whether or not the own vehicle enters a motorway. In the case where driveway_state=0, that is, the own vehicle exits from a motorway (step S432: No), the LTC unit 12 shifts the processing to processing in step S450 in FIG. 7.

In the case where driveway_state=1 (step S432: Yes), the LTC unit 12 determines whether or not HMI_state=NON_DISPLAY (step S434).

In the case where HMI_state=NON_DISPLAY (step S434: Yes), the LTC unit 12 sets values of various kinds of parameters as follows (step S436).

HMI_state=LTC_ENABLE, lateral_control_enable_flg=OFF, lateral_control_ref=0, longitudinal_control_enable_flg=OFF, and longitudinal_control_ref=0.

Figure 10:
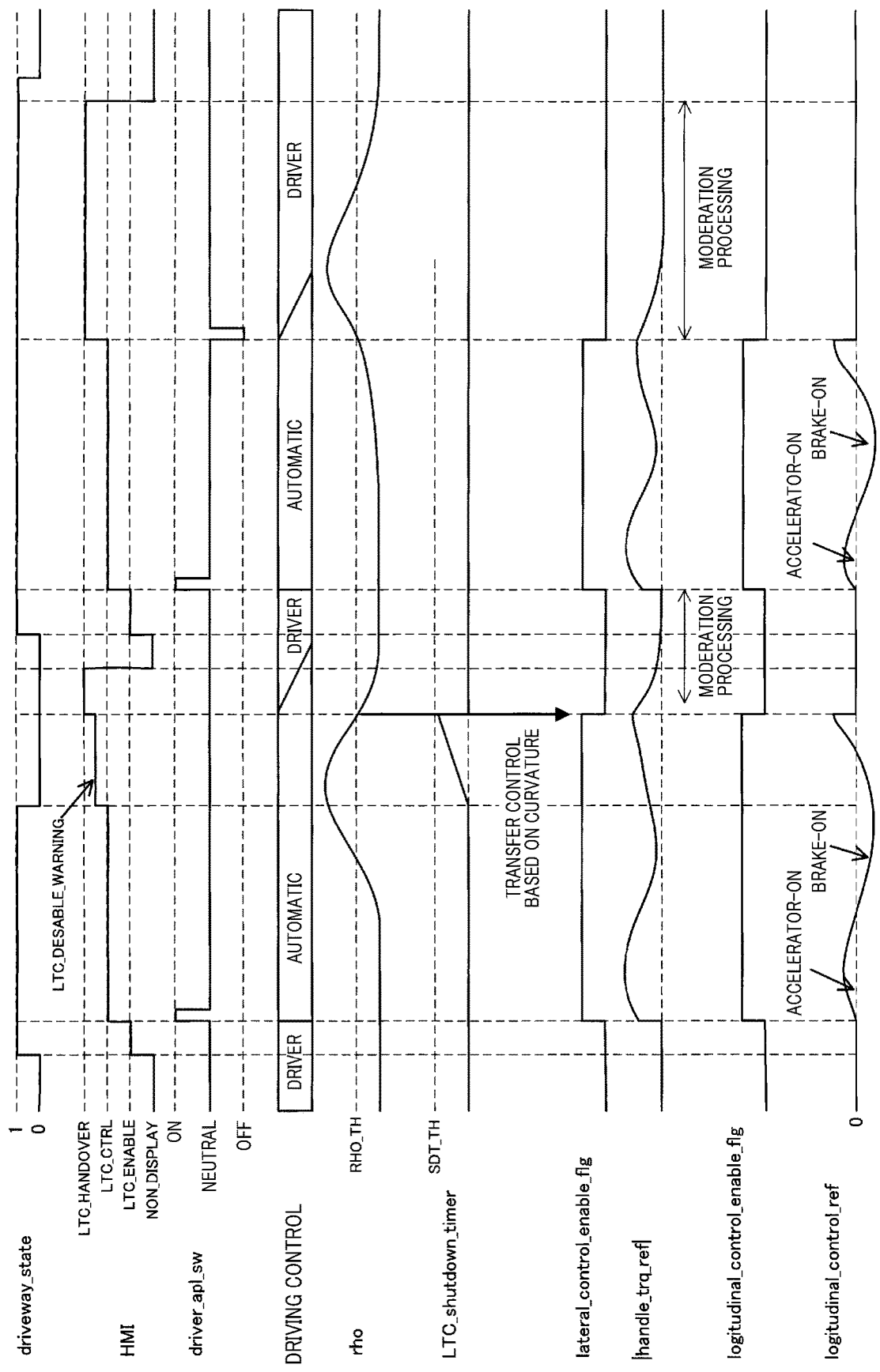
FIG. 10 is a time chart illustrating LTC processing.
Figure 11:
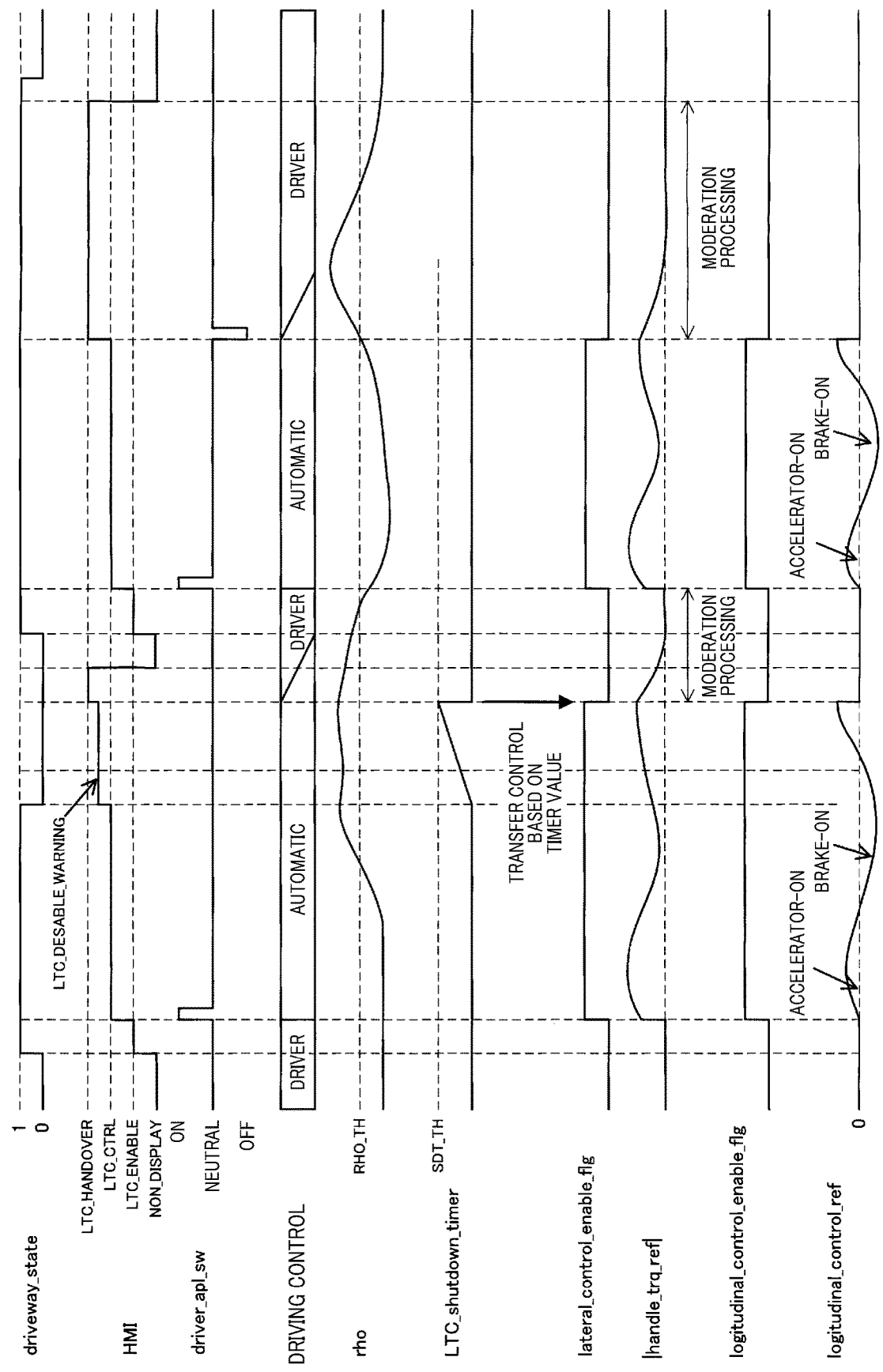
FIG. 11 is another time chart illustrating LTC processing.

As illustrated in FIG. 10 and FIG. 11, if the own vehicle enters a motorway, because HMI_state is set from NON_DISPLAY to LTC_ENABLE in step S436, the determination in step S434 becomes "No" in the processing next time, and the processing is shifted to processing in step S438.

ON of lateral_control_enable_flg indicates that lateral direction movement of the own vehicle is being controlled by steering control for driving the steering wheel in the lane trace control, and OFF indicates that steering control for driving the steering wheel is stopped. lateral_control_ref indicates a commanded lateral position for the own vehicle.

In the present embodiment, in FIG. 3, the central position 204 in a width direction of the driving lane, that is, a position at the center between the left white line 200 and the right white line 202 is set as the commanded lateral position. Further, in FIG. 4, the central position in the width direction of the driving lane defined with the left boundary 220 and the right boundary 222 including the white lines 200 and 210 is set as the commanded lateral position.

The variable longitudinal_control_enable_flg being ON indicates that vehicle speed control of the own vehicle by the powertrain system 42 and the brake system 44 is being executed in lane trace control, while OFF indicates that vehicle speed control of the own vehicle is stopped. longitudinal_control_ref indicates commanded acceleration for the own vehicle for controlling the vehicle speed of the own vehicle to commanded vehicle speed set by the vehicle speed setter 24.

In the case where HMI_state=NON_DISPLAY (step S434: No), the LTC unit 12 determines whether or not driver_apl_sw_flg=ON, or driver_apl_sw_flg=ON or neutral and HMI_state=LTC_CTRL (step S438).

That is, it is determined whether or not a predetermined time period has elapsed since the LTC start SW 22 was turned on from the reference position or whether or not the LTC start SW 22 has not been turned off from the reference position and LTC control is being executed.

In the case where driver_apl_sw_flg=ON or driver_apl_sw_flg=ON or neutral and HMI_state=LTC_CTRL (step S438: Yes), the LTC unit 12 sets values of various kinds of parameters as follows as illustrated in FIG. 10 and FIG. 11 (step S440).

HMI_state=LTC_CTRL, lateral_control_enable_flg=ON, lateral_control_ref=0, and longitudinal_control_enable_flg=ON.

ON of lateral_control_enable_flg indicates that lateral direction movement control for controlling the lateral position of the own vehicle is executed by executing steering control with respect to the steering wheel in lane trace control, while OFF indicates that the lateral direction movement control is terminated.

lateral_control_ref is a commanded lateral position for the own vehicle. lateral_control_ref=0 indicates a reference position of the commanded lateral position. In FIG. 3, the commanded lateral position of lateral_control_ref=0 indicates the central position 204 in the width direction of the driving lane.

ON of longitudinal_control_enable_flg indicates that longitudinal movement control for controlling the vehicle speed of the own vehicle to the commanded vehicle speed set by the vehicle speed setter 24 in the lane trace control, while OFF indicates that the longitudinal direction movement control is terminated.

Further, in step S440, the LTC unit 12 calculates commanded acceleration (longitudinal_control_ref) for the own vehicle on the basis of the following equation (1) to (3) (step S440).

$$diffV = Vspd\_ref - Vspd \quad (1)$$

$$diffV\_int = diffV\_int[n-1] + (diffV[n-1] + diffV)*TS/2 \quad (2)$$

$$longitudinal\_control\_ref = KP\_LONG*diffV + KI\_LONG*diffV\_int \quad (3)$$

In equation (1), diffV indicates a difference between the commanded vehicle speed (Vspd_ref) and actual vehicle speed (Vspd). In equation (2), diffV_int is a value obtained by adding an integrated value of differences between the commanded vehicle speed and the actual vehicle speed at time intervals (TS) from the previous processing to the processing of this time to an integrated value of differences between the commanded vehicle speed and the actual vehicle speed until the previous time. That is, diffV_int indicates an integrated value of the differences between the commanded vehicle speed and the actual vehicle speed until this time.

A proportional term (P term) and an integral term (I term) of feedback control are obtained on the basis of diffV obtained in equation (1) and diffV_int obtained in equation (2), and commanded acceleration for the own vehicle is calculated from equation (3).

In the case where driver_apl_sw_flg is not ON, and HMI_state is other than LTC_CTRL or driver_apl_sw_flg=OFF (step S438: No), the LTC unit 12 determines whether or not driver_apl_sw_flg=OFF or HMI_state=HAND_OVER (step S442).

That is, it is determined whether or not the LTC start SW 22 is turned off from the reference position while the own vehicle is driving on a motorway or transferring of control to the driver is started.

In the case where driver_apl_sw_flg=OFF or HMI_state=HAND_OVER (step S442: Yes), the LTC unit 12 sets values of various kinds of parameters as follows (step S444).

HMI_state=LTC_handover, lateral_control_enable_flg=OFF, lateral_control_ref=0, longitudinal_control_enable_flg=OFF, longitudinal_control_ref=0, and handover_timer=handover_timer+1.

By LTC_handover being set as HMI_state, start of transferring of driving control to the driver is notified with at least one of sound, an image and light. handover_timer measures a period during which start of transferring driving control to the driver is notified.

By lateral_control_enable_flg and longitudinal_control_enable_flg being turned off, processing of transferring driving control to the driver from the lane trace control is started.

Then, the LTC unit 12 determines whether or not handover_timer HOV_TH (step S446). HOV_TH indicates a period during which start of transferring driving control to the driver is notified.

If handover_timer≥HOV_TH (step S446: Yes), the LTC unit 12 judges that a period during which start of transferring driving control to the driver is notified ends, and sets values of various kinds of parameters as follows (step S448). HMI_state=NON_DISPLAY, handover_timer=0 and diffV_int=0.

By setting HMI_state=NON_DISPLAY, notification of start of transferring driving control to the driver is terminated. By setting diffV_int=0, diffV_int [n−1] to be used in equation (2) when a speed command value in a longitudinal direction is calculated in lane trace control of next time is initialized.

Figure 7:
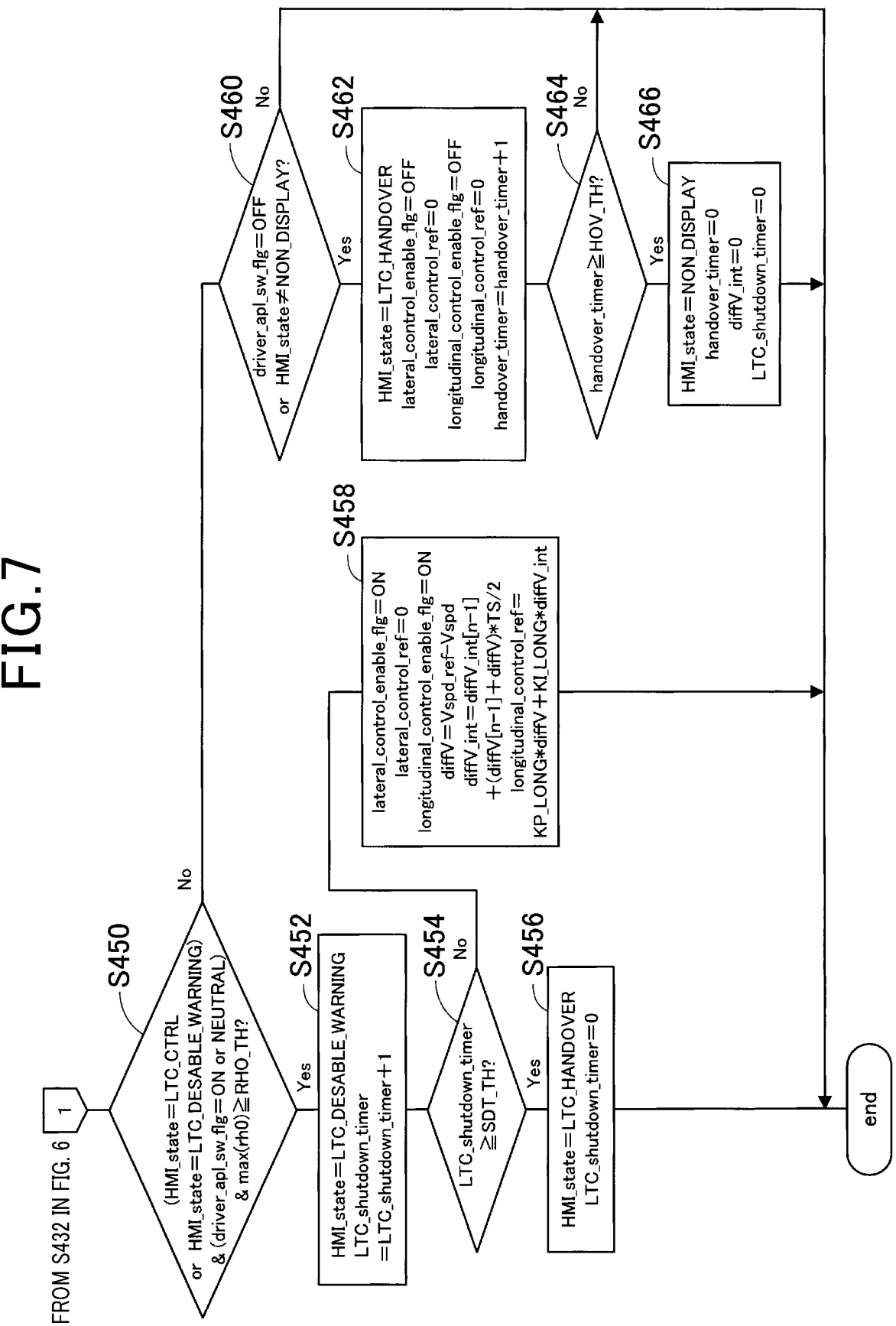
FIG. 7 is a flowchart illustrating LTC processing.

In step S450 in FIG. 7, the LTC unit 12 determines whether or not conditions of (1) to (3) which will be described below are satisfied at the same time.
(1) HMI_state=LTC_CTRL or HMI_state=LTC_DESABLE_WARNING HMI_state=LTC_CTRL in step S450 indicates that the lane trace control is still being executed although the own vehicle exits from a motorway. HMI_state=LTC_DESABLE_WARNING in S450 indicates that the own vehicle exits from a motorway and termination of the lane trace control is notified.
(2) driver_apl_sw_flg=ON or neutral Either driver_apl_sw_flg=ON or neutral in step S450 indicates that the LTC start SW 22 is not turned off from the reference position when the own vehicle exits from a motorway.
(3) max(rho)≥RHO_TH max(rho)≥RHO_TH in step S450 indicates that a maximum value (max(rho)) of curvature of the driving lane ahead of the own vehicle in the driving direction is equal to or greater than RHO_TH which is a predetermined value when the own vehicle exits from a motorway. In the present embodiment, max(rho) is a maximum value among 15 most-recently calculated curvature values calculated at intervals of 10 meters on the driving lane ahead of the own vehicle in the driving direction. Because a radius of the curvature of the driving lane is smaller for greater curvature, a curviness degree of the driving lane is larger for greater curvature.

If driving control is immediately transferred to the driver when rho≥RHO_TH, the driver needs to drive on a driving lane with a large curviness degree by manipulating the steering wheel immediately after the own vehicle exits from a motorway. This imposes a great burden of driving on the driver.

Therefore, in the case where the above-described conditions (1) and (2) are satisfied and the above-described conditions (3) that the own vehicle exits from a motorway and a curviness degree of the driving lane ahead of the own vehicle in the driving direction is equal to or larger than a predetermined value are satisfied, the LTC unit 12 does not immediately transfer driving control to the driver, and executes processing of the following step S452 to S458 to continue the lane trace control.

If the conditions of the above-described (1) to (3) are satisfied at the same time (step S450: Yes), the LTC unit 12 sets LTC_DESABLE_WARNING as HMI_state, and notifies to the driver that the lane trace control is terminated (step S452). In this case, because the lane trace control is terminated soon, not only termination of the lane trace control is notified, but also notification which encourages the driver to perform driving such as "grab the steering wheel" may be performed.

Further, the LTC unit 12 increments LTC_shutdown_timer by one (step S452). LTC_shutdown_timer is a timer for measuring a time period elapsed since the own vehicle has exited from a motorway.

As illustrated in FIG. 11, if LTC_shutdown_timer becomes equal to or greater than SDT_TH (step S454: Yes), the LTC unit 12 judges that SDT_TH which is a predetermined time period has elapsed since the own vehicle has exited from a motorway and termination of the lane trace control has been notified, sets LTC_HANDOVER as HMI_state at, and initializes LTC_shutdown_timer to 0 (step S456).

By this means, if a predetermined time period has elapsed since the own vehicle has exited from a motorway and termination of the lane trace control has been notified, even if rho≥RHO_THL and the curviness degree of the driving lane is equal to or larger than a predetermined degree, processing of transferring driving to the driver is started.

If LTC_shutdown_timer is less than SDT_TH (step S454: No), the LTC unit 12 sets values of various kinds of parameters as follows (step S458).

lateral_control_enable_flg=ON, lateral_control_ref=0, and longitudinal_control_enable_flg=ON. Further, longitudinal_control_ref is set on the basis of the aforementioned equations (1) to (3) (step S458). That is, the LTC unit 12 continuously executes the lane trace control while LTC_shutdown_timer is less than SDT_TH.

Note that, in the case where longitudinal_control_ref is set on the basis of the aforementioned equations (1) to (3) in step S458, because the own vehicle exits from a motorway, regardless of the vehicle speed set by the driver through the vehicle speed setter 24, the commanded vehicle speed (Vspd_ref) is decreased to, for example, the speed limit for passing through an ETC gate, or the speed limit for the road which leads to a general road from a motorway.

The determination in step S450 becomes "No" after the own vehicle exits from a motorway when rho<RHO_TH or LTC_shutdown_timer≥SDT_TH. That is, as illustrated in FIG. 10, the determination in step S450 becomes "No" when the curviness degree of the driving lane becomes smaller than a predetermined value before a predetermined time period has elapsed since the own vehicle has exited from the motorway or when a predetermined time period has elapsed since the own vehicle has exited from the motorway as illustrated in FIG. 11.

Further, even if LTC_shutdown_timer<SDT_TH and rho≥RHO_TH, if the LTC start SW 22 is turned off from the reference position and HMI_state=OFF, because the driver commands transferring driving control, the determination in step S450 becomes "No". As a result, processing from step S462 to step S466 which will be described later of transferring driving control to the driver is immediately executed.

That is, even if the predetermined time period has not elapsed since the own vehicle has exited from a motorway and the curviness degree of the driving lane ahead of the own vehicle in the driving direction is equal to or greater than the predetermined value, if the LTC start SW 22 is turned off from the reference position, processing of transferring driving control to the driver is immediately executed.

If the determination in step S450 becomes "No", the LTC unit 12 determines whether or not driver_apl_sw_flg=OFF or HMI_state is other than NON_DISPLAY (step S460). A case where driver_apl_sw_flg=OFF is a case where the driver commands transferring of driving control.

In step S460, a possible state where HMI_state is other than NON_DISPLAY is the following (1) to (3). A case where HMI_state=LTC_ENABLE could never occur in step S460.

(1) HMI_state=LTC_CTRL

The curviness degree of the driving lane is smaller than a predetermined value when the own vehicle exits from a motorway.

(2) HMI_state=LTC_DESABLE_WARNING

The curviness degree of the driving lane is equal to or greater than the predetermined value when the own vehicle exits from the motorway, and the curviness degree of the driving lane becomes smaller than the predetermined value while termination of the LTC is notified.

(3) HMI_state=LTC_HANDOVER

The determination in step S460 becomes "Yes", and LTC_HANDOVER is set as HMI_state in processing of step S462.

In the case where driver_apl_sw_flg=OFF or HMI_state is other than NON_DISPLAY (step S460: Yes), the LTC unit 12 sets values of various kinds of parameters in a similar manner to step S444 in FIG. 6 (step S462).

The LTC unit 12 then determines whether or not handover_timer≥HOV_TH (step S464).

If handover_timer HOV_TH (step S464: Yes), the LTC unit 12 judges that a period during which start of transferring driving control to the driver is notified ends, and sets values of various kinds of parameters as follows (step S466). HMI_state=NON_DISPLAY, handover_timer=0, diffV_int=0 and LTC_shutdown_timer=0.

By setting HMI_state=NON_DISPLAY, notification of start of transferring driving control to the driver is terminated. By setting diffV_int=0, diffV_int [n−1] to be used in equation (2) when a speed command value in the longitudinal direction is calculated in lane trace control of the next time is initialized.

By setting LTC_shutdown_timer=0, LTC_shutdown_timer is initialized in step S452 in view of the determination in step S450 becoming "No" during counting of LTC_shutdown_timer.

(2-4. Lateral Direction Movement Control Processing)

The lateral direction movement control processing to be executed by the lateral direction movement control unit 14 will be described.

Figure 8:
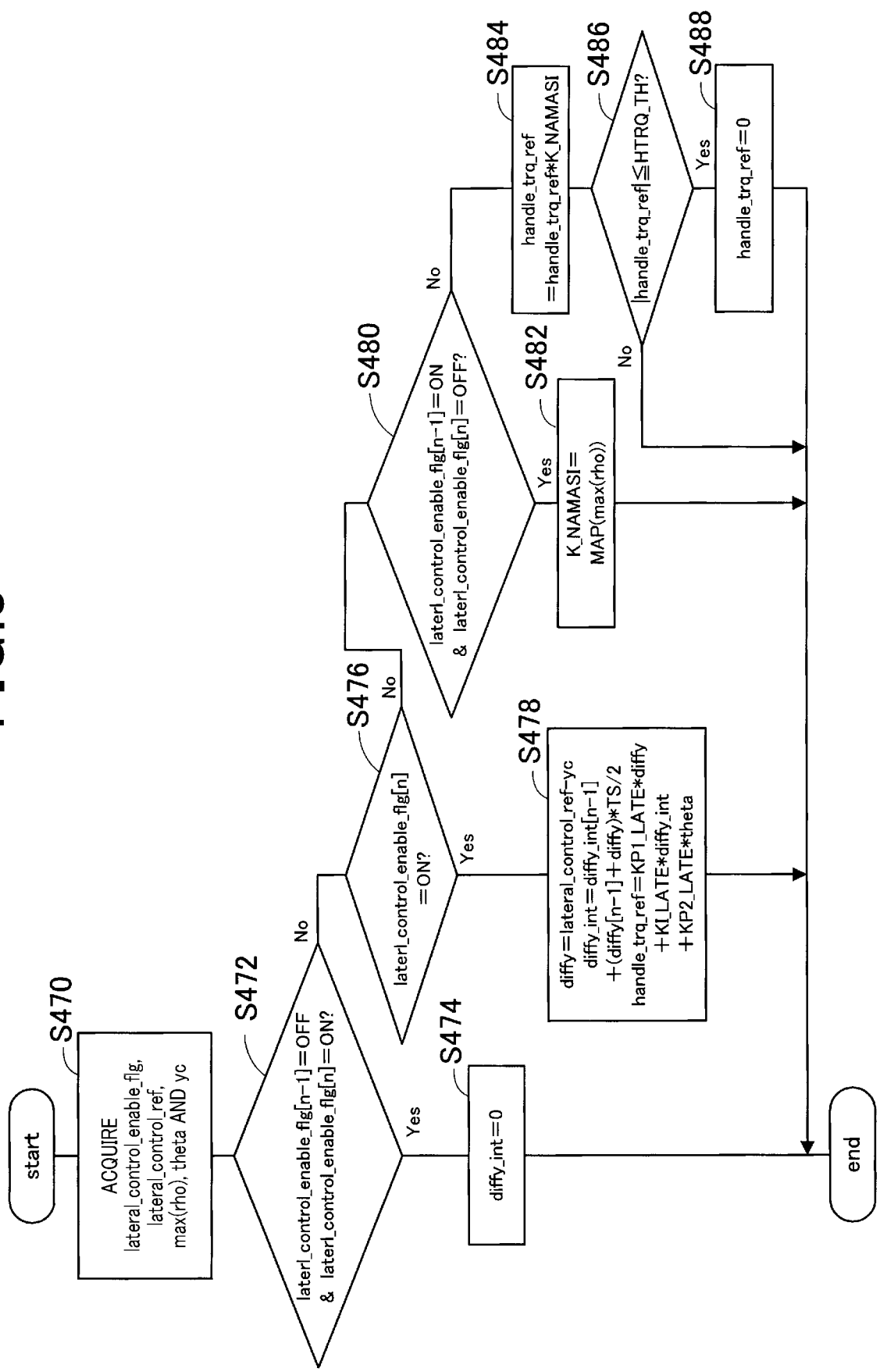
FIG. 8 is a flowchart illustrating lateral direction movement control processing.

In step S470 in FIG. 8, the lateral direction movement control unit 14 acquires lateral_control_enable_flg, lateral_control_ref, max(rho), theta and yc from the LTC unit 12.

Then, in step S472, the lateral direction movement control unit 14 determines whether or not lateral_control_enable_flg [n−1]=OFF and lateral_control_enable_flg [n]=ON. lateral_control_enable_flg [n−1] is a value acquired last time, and lateral_control_enable_flg [n] is a value acquired this time.

If lateral_control_enable_flg [n−1]=OFF and lateral_control_enable_flg [n]=ON (step S472: Yes), the lateral direction movement control unit 14 judges that the own vehicle enters a motorway, and start of lane trace control is commanded. In this case, the lateral direction movement control unit 14 initializes diffy_int which is an integral term by setting 0 to perform feedback control on steering control with respect to the steering wheel (step S474).

In the case where lateral_control_enable_flg [n−1]=OFF and lateral_control_enable_flg [n] is not ON (step S472:

No), the lateral direction movement control unit 14 determines whether or not lateral_control_enable_flg [n]=ON (step S476).

In the case where lateral_control_enable_flg [n]=ON (step S476: Yes), the lateral direction movement control unit 14 judges that the lane trace control is being executed and calculates a torque control command value (handle_trq_ref) for executing steering control with respect to the steering wheel on the basis of the following equation (4) to (6) (step S478).

$$diffy = lateral\_control\_ref - yc \quad (4)$$

$$diffy\_int$$
$$= diffy\_int[n-1] + (diffy[N-1] + diffy) * TS/2 \quad (5)$$

$$handle\_trq\_ref = KP1\_LATE * diffy + KI\_LATE * diffy\_int + KP2\_LATE * theta \quad (6)$$

In (4), diffy indicates a difference between the commanded lateral position and a lateral position of the center of gravity 102 of the own vehicle 100. As mentioned above, in the present embodiment, because a lateral position of the central position 204 of a width in the lateral direction of the driving lane is set as a reference point, and the reference point is set as the commanded lateral position, lateral_control_ref=0.

In equation (5), diffy_int is a value obtained by adding an integrated value of differences between the commanded lateral position and an actual lateral position at time intervals (TS) from the previous processing to the processing of this time to an integrated value of differences between the commanded lateral position and the actual lateral position until the previous time. That is, diffy_int indicates an integrated value of differences between the commanded lateral position and the actual lateral position until this time.

Then, proportional terms (a P1 term and a P2 term) and an integral term (I term) are obtained on the basis of diffy obtained in equation (4) and diffy_int obtained in equation (5) and a current yaw angle (theta), and a torque control command value for driving the steering wheel is calculated from equation (6).

By this means, while lateral_control_enable_flg=ON, steering control with respect to the steering wheel is executed by the torque control command value (handle_trq_ref) calculated in equation (6). FIG. 10 and FIG. 11 illustrate change of an absolute value of the torque control command value (handle_trq_ref) while lateral_control_enable_flg=ON.

In the case where lateral_control_enable_flg [n]=OFF (step S476: No), the lateral direction movement control unit 14 determines whether or not lateral_control_enable_flg [n−1]=ON and lateral_control_enable_flg [n]=OFF (step S480).

In the case where lateral_control_enable_flg [n−1.]=ON and lateral_contrl_enable_flg [n]=OFF (step S480: Yes), the lateral direction movement control unit 14 judges that termination of the lane trace control is commanded and starts processing of transferring driving control to the driver.

In this case, in step S482, the lateral direction movement control unit 14 calculates a moderation factor (K_MODERATION<1) of the torque control command value for executing processing of moderating steering control with respect to the steering wheel using max(rho) as a parameter from a map using the following equation (7).

$$K\_MODERATION = MAP(max(rho)) \quad (7)$$

It is desirable to set a smaller moderation factor for a larger maximum value of driving lane curvature, that is, for a larger maximum value of the curviness degree of the driving lane, so that the torque control command value moderately decreases. By this means, it is possible to moderately increase a driving amount of the steering wheel by the driver, and moderately increase a burden of the driving by the driver.

In the case where lateral_control_enable_flg [n−1]=ON and lateral_control_enable_flg [n] is not OFF (step S480: No), the lateral direction movement control unit 14 judges that moderation processing for starting processing of transferring driving control to the driver is started, and calculates the torque control command value (handle_trq_ref) for driving the steering wheel from the following equation (8) (step S484).

$$\text{handle\_trq\_ref} = \text{handle\_trq\_ref} * K\_\text{MODERATION} \quad (8)$$

Because K_MODERATION<1, every time step S484 is executed, an absolute value of handle_trq_ref calculated in step S484 becomes smaller as indicated with a period of moderation processing in FIG. 10 and FIG. 11.

When the absolute value of handle_trq_ref becomes equal to or less than HTRQ_TH which is a predetermined value (step S486: Yes), the lateral direction movement control unit 14 sets handle_trq_ref to 0 and terminates the moderation processing as illustrated in FIG. 10 and FIG. 11 (step S488). By this means, when the torque command control value becomes equal to or less than HTRQ_TH, the moderation processing can be terminated.

While the absolute value of handle_trq_ref is greater than HTRQ_TH (step S486: No), the lateral direction movement control unit 14 continues the moderation processing.

(2-5. Longitudinal direction movement control processing)

Longitudinal direction movement control processing to be executed by the longitudinal direction movement control unit 16 will be described.

Figure 9:
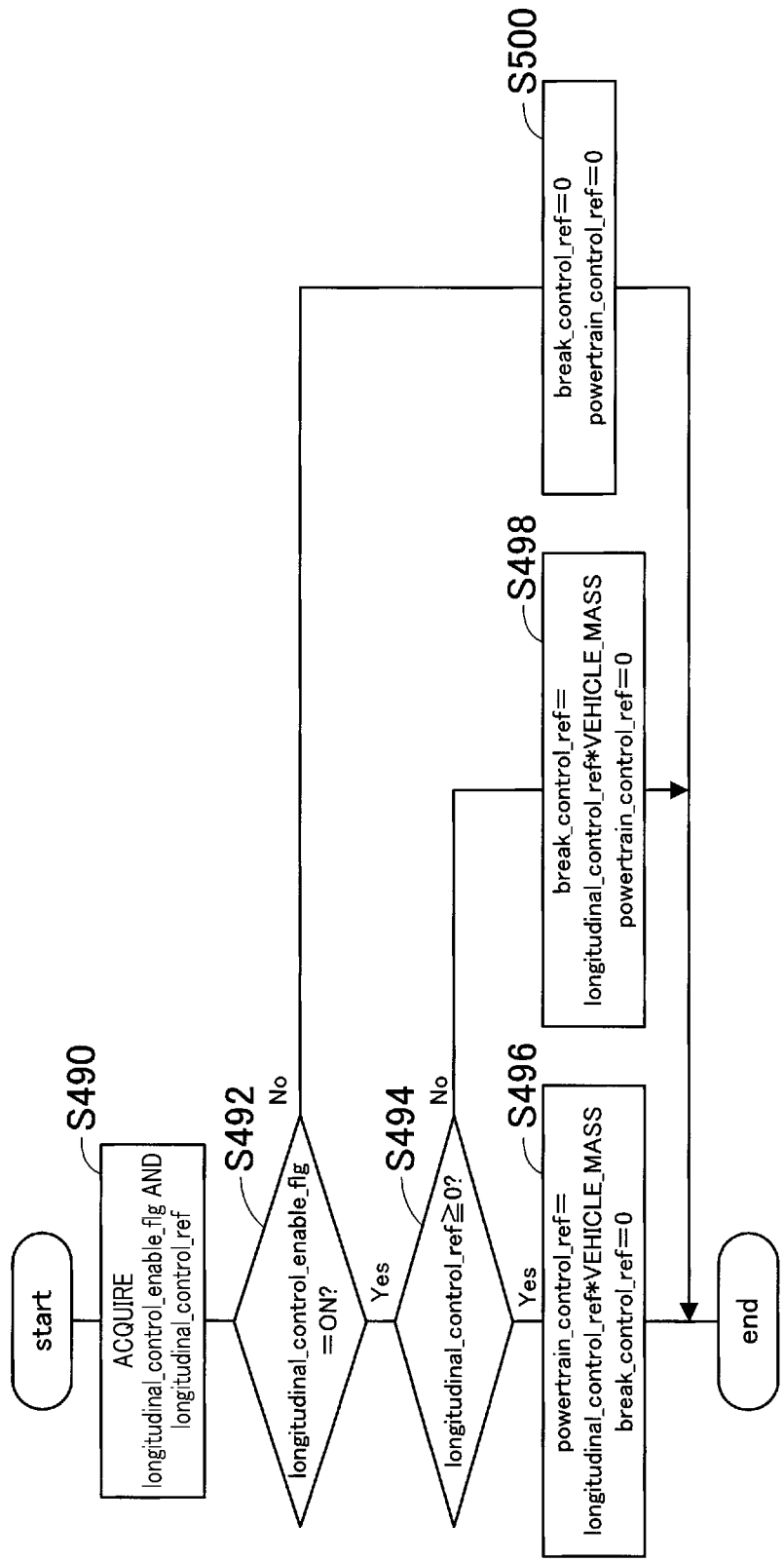
FIG. 9 is a flowchart illustrating longitudinal direction movement control processing.

In step S490 in FIG. 9, the longitudinal direction movement control unit acquires longitudinal_control_enable_flg and longitudinal_control_ref from the LTC unit 12.

Then, in step S492, the longitudinal direction movement control unit 16 determines whether or not longitudinal_control_enable_flg=ON, that is, the lane trace control is being executed. In the case where longitudinal_control_enable_flg=ON, that is, the lane trace control is being executed (step S492: Yes), the longitudinal direction movement control unit 16 determines whether or not longitudinal_control_ref 0 (step S494).

In the case where longitudinal_control_ref 0 (step S494: Yes), that is, in the case where the commanded acceleration is equal to or greater than 0, the longitudinal direction movement control unit 16 calculates drive output (powertrain_control_ref) to be directed to the powertrain system 42 from the following equation (9) (step S496).

$$\text{powertrain\_control\_ref} = \text{longitudinal\_control\_ref} * \text{VEHICLE\_MASS} \quad (9)$$

In the case where the commanded acceleration is equal to or greater than 0, because it is not necessary to actuate braking force, the longitudinal direction movement control unit 16 sets braking force (break_control_ref) to be directed to the brake system 44 to 0 (step S496).

In the case where longitudinal_control_ref<0 (step S494: No), that is, in the case where the commanded acceleration is negative, the longitudinal direction movement control unit 16 calculates the braking force (break_control_ref) to be directed to the brake system 44 from the following equation (10) (step S498).

$$\text{break\_control\_ref} = \text{longitudinal\_control\_ref} * \text{VEHICLE\_MASS} \quad (10)$$

In the case where the commanded acceleration is negative, because it is not necessary to actuate drive output, the longitudinal direction movement control unit 16 sets the drive output (powertrain_control_ref) to be directed to the powertrain system 42 to 0 (step S498).

In this manner, by the drive output and the braking force being controlled through the lane trace control on the basis of the value of longitudinal_control_ref, control similar to accelerator-on manipulation and brake-on manipulation by the driver is executed as illustrated in FIG. 10 and FIG. 11.

In the case where longitudinal_control_enable_flg=OFF (step S492: No), because the lane trace control is stopped, the longitudinal direction movement control unit 16 sets powertrain_control_ref=0 and break_control_ref=0 (step S500).

Figure 1B:
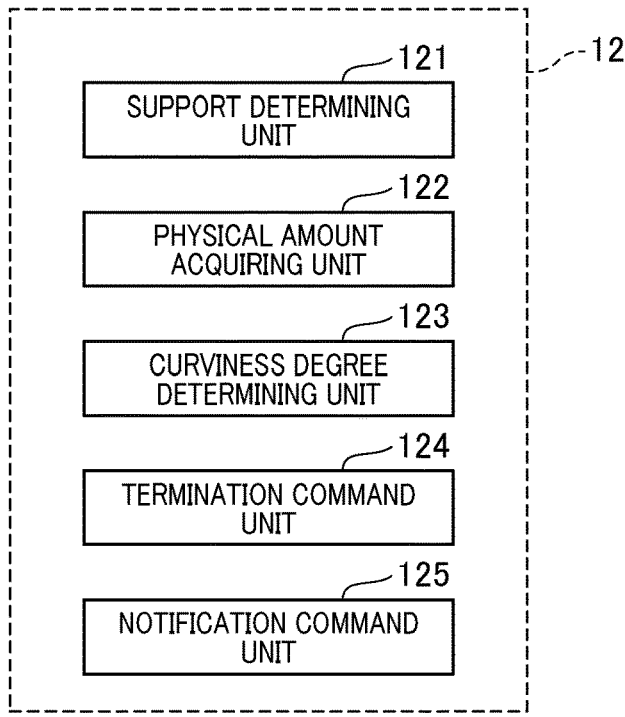
FIG. 1B is a functional block diagram of an LTC unit in the driving support system in FIG. 1A.
Figure 2:
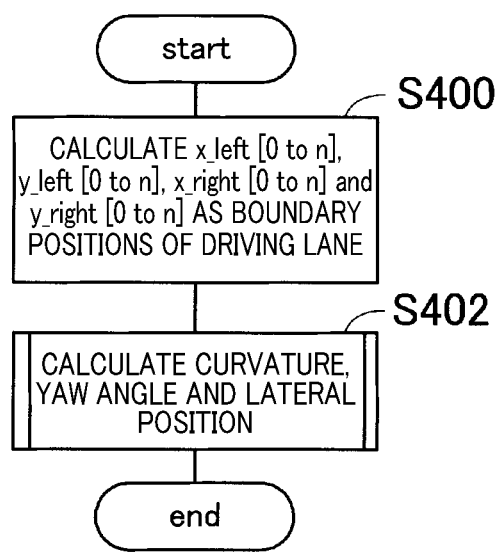
FIG. 2 is a flowchart illustrating processing by a camera unit.

FIG. 1B illustrates functional blocks indicating functions of the LTC unit 2. The LTC unit 2 includes functional blocks such as a support determining unit 121, a physical amount acquiring unit 122, a curviness degree determining unit 123, a termination command unit 124 and a notification command unit 125.

The support determining unit 121, which is a functional block executing step S432, is configured to determine whether or not predetermined conditions for terminating driving support control by the driving support control unit 17 are satisfied. The support determining unit 121 may, for example, determine that the predetermined conditions are satisfied if the own vehicle exits from a motorway.

The physical amount acquiring unit 122, which is a functional block executing step S450, is configured to acquire a physical amount corresponding to a curviness degree of the driving lane on which the own vehicle drives. The curviness degree determining unit 123, which is also a functional block executing step S450, determines whether or not the curviness degree indicated by the physical amount acquired by the physical amount acquiring unit 122 is smaller than a predetermined degree when the support determining unit 121 determines that the predetermined conditions are satisfied. For example, the physical amount acquiring unit 122 may be configured to acquire curvature of the driving lane as the physical amount, and the curviness degree determining unit 123 may be configured to determine whether or not the curviness degree is smaller than the predetermined degree in accordance with whether or not the curvature is smaller than a predetermined value. At this time, the physical amount acquiring unit 122 may acquire the curvature of the driving lane ahead of the own vehicle in the driving direction as the curvature of the driving lane, for example, on the basis of map information. Alternatively or additionally, the physical amount acquiring unit 122 may be configured to acquire a steering angle, and the curviness degree determining unit 123 may be configured to determine whether or not the curviness degree is smaller than the predetermined degree in accordance with whether or not the steering angle is smaller than a predetermined value.

The termination command unit 124, which is a functional block executing step S462, commands the driving support control unit to terminate the driving support control when the curviness degree determining unit determines that the curviness degree is smaller than the predetermined degree. The termination command unit 124, which is a functional block further executing step S454 and S456, commands the driving support control unit to terminate the driving support control when a predetermined time period has elapsed since the predetermined conditions are satisfied even if the curviness degree is equal to or larger than the predetermined degree.

The notification command unit 125, which is a functional block executing step S452, is configured to notification termination of the driving support control before the termination command unit commands the driving support control unit to terminate the driving support control.

In the present embodiment, as illustrated in FIG. 1A, the lateral direction movement control unit 14 which executes step S470 to S488 and the longitudinal direction movement control unit 16 which executes step S490 to S500 constitute a driving support control unit 17 which executes driving support control for supporting at least part of driving by the driver. The driving support control unit 17 is configured to gradually decrease a control variable by the driving support control when termination of the driving support control is commanded from the termination command unit 124 as indicated in step S482 to S486. At this time, the driving support control unit 17 adjusts a decreasing degree of the control variable in accordance with the physical amount, for example, vehicle speed of the own vehicle. The driving support control unit 17 supports steering control by executing step S470 to S488 through the lateral direction movement control unit 14. The driving support control unit 17 supports vehicle speed control by executing step S490 to S500 through the longitudinal direction movement control unit 16.

(3. Effects)

The following effects can be obtained in the embodiment described above.

(1) Even if the own vehicle exits from a motorway, in the case where maximum curvature of the driving lane ahead of the own vehicle in the driving direction is equal to or greater than a predetermined value and a curviness degree of the driving lane is large, lane trace control is not immediately terminated. Then, until the maximum curvature of the driving lane ahead of the own vehicle in the driving direction becomes smaller than the predetermined value and the curviness degree of the driving lane becomes small or a predetermined time period has elapsed since the own vehicle has exited from the motorway, lane trace control is continued.

By this means, even if the own vehicle exits from a motorway, in the case where the maximum curvature of the driving lane ahead of the own vehicle in the driving direction is equal to or greater than the predetermined value and the curviness degree of the driving lane is large, it is possible to direct an appropriate torque value for driving the steering wheel so that the lateral position of the own vehicle is located at the commanded lateral direction along the curvature of the driving lane.

Therefore, even if the own vehicle exits from the motorway, because it is possible to avoid a situation where the driver suddenly drives on a driving lane whose maximum curvature is equal to or greater than the predetermined value and whose curviness degree is large, that is, suddenly addresses a situation where steering manipulation is difficult, it is possible to reduce a burden of the steering manipulation by the driver as small as possible.

(2) Even if the own vehicle exits from a motorway and maximum curvature of the driving lane ahead of the own vehicle in the driving direction is equal to or greater than the predetermined value and the curviness degree of the driving lane is large, if a predetermined time period has elapsed since the own vehicle has exited from the motorway, lane trace control is terminated. By this means, if the predetermined time period is appropriately set, even in the case where a situation where the curviness degree of the driving lane is large continues after the own vehicle exits from the motorway, it is possible to avoid a situation where the own vehicle enters a general road while lane trace control is continued after the own vehicle exits from the motorway.

(3) Because, in the above-described embodiment, the curvature of the driving lane ahead of the own vehicle in the driving direction is calculated, even if the curvature of the driving lane immediately after exiting from the motorway is smaller than the predetermined value, if the curvature far ahead is equal to or greater than the predetermined value, lane trace control is continued. Therefore, in the case where the curviness degree of the driving lane ahead in the driving direction is large when the own vehicle exits from the motorway, it is possible to reduce a burden of steering manipulation by the driver to be as small as possible.

(4. Other Embodiments)

(1) In the above-described embodiment, the curvature of the driving lane is used as the physical amount corresponding to the curviness degree of the driving lane of the own vehicle. Other than this, it is also possible to use a steering angle, acceleration in a lateral direction of the own vehicle detected by an acceleration sensor, or the like, as the physical amount corresponding to the curviness degree of the driving lane of the own vehicle. It can be judged that the curviness degree of the driving lane is larger as the steering angle is larger, and the curviness degree of the driving lane is larger as the acceleration in the lateral direction is larger.

In the case where the steering angle is used as the physical amount corresponding to the curviness degree of the driving lane of the own vehicle, as illustrated in FIG. 1A, the lateral direction movement control unit 14 acquires the steering angle from the steering system 40.

(2) The driving support apparatus 10 may acquire the curvature of the driving lane not from image data captured by the camera unit 20 but from map information in a map DB provided in the navigation apparatus 26 illustrated in FIG. 1A.

(3) The moderation factor of the torque control command value for driving the steering wheel may be variably set in accordance with vehicle speed. For example, the moderation factor may be set smaller as the vehicle speed is higher, so that a decreasing degree of the torque control command value becomes smaller.

(4) In the above-described embodiment, when the predetermined time period has elapsed since the own vehicle has exited from a motorway, even if the curvature is equal to or greater than the predetermined value, lane trace control is terminated. In this case, the predetermined time period may be set longer as the curvature is greater in a range where the curvature is equal to or greater than the predetermined value. By this means, a time period during which lane trace control is continued becomes longer as the curviness degree of the driving lane is larger.

(5) In the above-described embodiment, when the own vehicle enters a motorway and the driver turns on the LTC start SW 22, lane trace control is executed as the driving support control. In contrast, the driving support control may be executed when the LTC start SW 22 is turned on regardless of whether or not the own vehicle enters a motorway.

(6) In the above-described embodiment, both vehicle speed control and steering control of the own vehicle are controlled as the driving support control. In contrast, one of the vehicle speed control and steering control of the own vehicle may be controlled as the driving support control.

(7) In the above-described embodiment, conditions for terminating the lane trace control as the driving support control are that the own vehicle exits from a motorway. In contrast, the driving support control may be terminated when the driver turns off the LTC start SW 22 during the driving support control, the driver grabs the steering wheel to manipulate the steering wheel, or the driver manipulates an accelerator pedal and a brake pedal, regardless of whether or not the own vehicle exits from a motorway.

Also in this case, it is desirable to continue the driving support control until the curviness degree of the driving lane of the own vehicle becomes smaller than the predetermined value instead of immediately terminating the driving support control.

(8) In the case where the drive output and the braking force are calculated in the longitudinal direction movement control processing in FIG. 9, a gradient of driving, air resistance, rolling resistance of tires, or the like, may be taken into account.

(9) It is also possible to disperse functions of one component in the above-described embodiments as a plurality of components, or integrate functions of a plurality of components into one component. Further, at least part of the configuration of the above-described embodiments may be replaced with a publicly known configuration having similar functions. Still further, part of the configuration of the above-described embodiment may be omitted as long as problems can be solved. Note that any aspect included in technical idea specified only by words recited in the claims is an embodiment of the present invention.

(10) The present invention can be implemented in various forms such as a driving support system 2 having the driving support apparatus 10 as a component, a driving support program for causing a computer to function as the driving support apparatus 10, a recording medium in which this driving support program is recorded, and a driving support method, other than the above-described driving support apparatus 10.

The invention claimed is:

1. A driving support apparatus comprising:
 a non-transitory memory storing one or more computer programs; and
 a processor executing one or more programs to:
  execute driving support control for supporting at least part of driving by a driver;
  determine whether or not predetermined conditions for terminating the driving support control are satisfied;
  acquire a physical amount corresponding to a curvature of a driving lane on which an own vehicle drives;
  in response to a determination that the predetermined conditions are satisfied, determine whether or not the curvature indicated by the acquired physical amount is smaller than a predetermined degree; and
  in response to a determination that the curvature is smaller than the predetermined degree, command to terminate the driving support control, and in response to a determination that the curvature is equal to or larger than the predetermined degree, command to continue the driving support control, wherein
 the commanding commands to terminate the driving support control in response to a predetermined time period having elapsed since the predetermined conditions were satisfied, in response to the curvature being equal to or larger than the predetermined degree.

2. The driving support apparatus according to claim 1, wherein
 determining whether or not the curvature is smaller than the predetermined degree is in accordance with whether or not the curvature is smaller than a predetermined value.

3. The driving support apparatus according to claim 2, wherein acquiring the physical amount corresponding to the curvature of the driving lane ahead of the own vehicle is in a driving direction.

4. The driving support apparatus according to claim 3, wherein acquiring the physical amount corresponding to the curvature is on the basis of map information.

5. The driving support apparatus according to claim 1, wherein acquiring a physical amount acquires a steering angle, and
 the determination that the curvature is smaller than the predetermined degree determines whether or not the curvature is smaller than the predetermined degree in accordance with whether or not the steering angle is smaller than a predetermined value.

6. The driving support apparatus according to claim 1, wherein the processor further executes one or more programs to notify termination of the driving support control before the processor commands to terminate the driving support control.

7. The driving support apparatus according to claim 1, wherein executing the driving support control gradually decreases a control variable by the driving support control in response to termination of the driving support control being commanded.

8. The driving support apparatus according to claim 7, wherein executing the driving support control adjusts a decreasing degree of the control variable in accordance with the physical amount.

9. The driving support apparatus according to claim 7, wherein executing the driving support control adjusts a decreasing degree of the control variable in accordance with vehicle speed of the own vehicle.

10. The driving support apparatus according to claim 1, wherein executing the driving support control supports steering control.

11. The driving support apparatus according to claim 1, wherein executing the driving support control supports vehicle speed control.

12. The driving support apparatus according to claim 1, wherein the determining whether the predetermined conditions are satisfied determines that the predetermined conditions are satisfied in response to the own vehicle exiting from a motorway.

13. The driving support apparatus according to claim 1, wherein the commanding commands to terminate the driving support control in response to a determination that the curvature is smaller than the predetermined degree and greater than or equal to a different predetermined non-zero degree.

* * * * *